(12) United States Patent
Weston

(10) Patent No.: US 7,975,912 B2
(45) Date of Patent: Jul. 12, 2011

(54) METHOD AND SYSTEM FOR OPERATING A HYBRID CARD READER

(75) Inventor: Timothy Martin Weston, Cedar Park, TX (US)

(73) Assignee: Dresser, Inc., Addison, TX (US)

( * ) Notice: Subject to any disclaimer, the term of this patent is extended or adjusted under 35 U.S.C. 154(b) by 275 days.

(21) Appl. No.: 11/952,708

(22) Filed: Dec. 7, 2007

(65) Prior Publication Data

US 2009/0145963 A1    Jun. 11, 2009

(51) Int. Cl.
*G06K 5/00* (2006.01)
(52) U.S. Cl. .......................... 235/380; 235/375; 235/440
(58) Field of Classification Search .................. 235/375, 235/380, 440, 441, 449, 492, 493
See application file for complete search history.

(56) References Cited

U.S. PATENT DOCUMENTS

| | | | |
|---|---|---|---|
| 4,843,221 A | 6/1989 | Ohtsuki et al. | |
| 5,331,138 A * | 7/1994 | Saroya | 235/449 |
| 5,554,840 A * | 9/1996 | Saroya | 235/441 |
| 5,594,233 A * | 1/1997 | Kenneth et al. | 235/492 |
| 5,679,945 A | 10/1997 | Renner et al. | |
| 5,847,371 A | 12/1998 | Ieda | |
| 6,021,944 A * | 2/2000 | Arakaki | 235/380 |
| 6,168,077 B1 | 1/2001 | Gray et al. | |
| 6,260,111 B1 | 7/2001 | Craig et al. | |
| 6,394,344 B1 * | 5/2002 | Katsumura et al. | 235/380 |
| 6,604,685 B1 | 8/2003 | Norton | |
| 6,761,310 B2 * | 7/2004 | May | 235/380 |
| 6,866,192 B2 | 3/2005 | Hosogoe et al. | |
| 2002/0170957 A1 * | 11/2002 | May | 235/380 |
| 2004/0089723 A1 * | 5/2004 | Moriya | 235/475 |
| 2004/0173677 A1 * | 9/2004 | Lucas et al. | 235/440 |
| 2005/0023348 A1 * | 2/2005 | Lucas et al. | 235/440 |
| 2005/0236491 A1 | 10/2005 | Leaming | |
| 2005/0242197 A1 | 11/2005 | Morrow et al. | |
| 2007/0108278 A1 * | 5/2007 | Masterton et al. | 235/439 |

OTHER PUBLICATIONS

Notification of Transmittal of the International Search Report and the Written Opinion of the International Searching Authority, or the Declaration (1 page); International Search Report (3 pages); Written Opinion of the International Searching Authority (6 pages); all issued in PCT International Application No. PCT/US2008/083110 on Apr. 1, 2009. (Total 10 pages).

* cited by examiner

*Primary Examiner* — Daniel A Hess
*Assistant Examiner* — Paultep Savusdiphol
(74) *Attorney, Agent, or Firm* — Fish & Richardson P.C.

(57) ABSTRACT

This disclosure provides for a method and system for operating a hybrid card reader that is operable to read magnetic stripe cards and that, upon the receipt of one or more signals, becomes operable to read integrated circuit cards. The hybrid card reader receives one or more signals from one or more remote devices. Such signals may be transmitted wirelessly or over one or more communication lines. When the one or more signals reach the hybrid card reader, they are used to enable a latching mechanism and an integrated circuit card reading function. This permits an integrated circuit card that is inserted into the hybrid card reader to be latched into place so that the data on the card can be read by the integrated circuit card reading function.

21 Claims, 3 Drawing Sheets

METHOD AND SYSTEM FOR OPERATING A HYBRID CARD READER

TECHNICAL FIELD

This disclosure relates to hybrid card readers capable of reading both magnetic stripe cards and integrated circuit cards, and more particularly, to systems and techniques for making hybrid card readers operable to read integrated circuit cards.

BACKGROUND

Hybrid card readers exist that are capable of reading both magnetic stripe cards and "smart cards," cards also known as "integrated circuit cards" ("IC" cards) because they use an integrated circuit to store information. To detect whether a card is a smart card or mag-stripe card, a hybrid card reader typically runs a default mag-stripe/integrated circuit card initialization command and locks the card in place using a latching mechanism. The reader then either releases the card if it determines that the card is not a smart card, or it reads the smart card while the card is latched. Unfortunately, the latching mechanism experiences wear and tear, especially when card users unwittingly try to remove their card from the reader while it is latched, which may occur when users expect the reader to be a mag-stripe reader without a locking mechanism.

SUMMARY

This disclosure provides for a method and system for operating a hybrid card reader that is operable to read magnetic stripe cards and that, upon the receipt of one or more signals, becomes operable to read integrated circuit cards ("IC" cards). The hybrid card reader receives one or more signals from one or more remote devices. Such signals may be sent wirelessly or over one or more communication lines. When the one or more signals reach the hybrid card reader, they are used to enable a latching mechanism and an integrated circuit card reading function either sequentially or substantially simultaneously. Such enabling may involve the use of an activation software module that receives one or more of the signals.

Typically, after such enabling, the hybrid card reader will detect the insertion of an IC card into it. This triggers the latching mechanism, which operates to hold the card into a position convenient to the hybrid card reader. The card reader will then read the data contained on the IC card and perform a transaction in accordance with the read data. Following the completion of the transaction, the IC card is unlatched and returned to the user.

Not only are the latching mechanism and integrated circuit card reading function capable of being enabled, they are also capable of being disabled. This may be accomplished in several ways, such as by sending one or more disabling signals from one or more remote devices to the hybrid card reader. These signals may be sent wirelessly or over one or more communication lines.

The system may include a number of components. These may include one or more devices for sending enabling and disabling signals that are located remote from the hybrid card reader. One or more communication lines for carrying such enabling and disabling signals may also be connected to the remote devices and hybrid card reader. The hybrid card reader includes a latching mechanism and an interface terminal for making an electrical connection with the IC card.

The details of these and other aspects and embodiments of the disclosure are set forth in the accompanying drawings and the description below. Other features, objects, and advantages of the various embodiments will be apparent from the description, drawings, and claims.

DETAILED DESCRIPTION

Hybrid card readers exist that read both mag-stripe cards and "smart cards," cards also known as "integrated circuit cards" ("IC" cards) because they use an integrated circuit to store information. To detect whether a card is a smart card or mag-stripe card, a hybrid card reader typically runs a default mag-stripe/integrated circuit card initialization command and locks the card in place using a latching mechanism. The reader then either releases the card if it determines the card is not a smart card, or it reads the smart card while the card is latched. Unfortunately, the latching mechanism experiences wear and tear, especially when card users unwittingly try to remove their card from the reader while it is latched, which may occur when users expect the reader to be a mag-stripe reader without a locking mechanism. Such wear and tear increases various costs associated with using hybrid card readers.

As a result, it is desirable to minimize this wear and tear. One way to do this is to employ the latching mechanism only if a smart card will be read. For instance, if it is known that a particular hybrid card reader will read mag-stripe cards only, until a subsequent date when it needs to be able to read both mag-stripe cards and IC cards, then it could be advantageous to have the latching mechanism and integrated circuit card reading function disabled until the needed date. This would reduce or eliminate the use of the latching mechanism until needed, thereby minimizing wear and tear. When it became necessary for the hybrid card reader to read IC cards, the latching mechanism and integrated circuit card reading function could be enabled by one or more signals sent to the hybrid card reader. It may be advantageous to send such signals from one or more locations remote from the hybrid card reader, especially if numerous hybrid card readers need to be enabled. For instance, these numerous hybrid card readers could be enabled simultaneously, or substantially simultaneously, by signals sent from a single remote location, if so desired.

Figure 1:
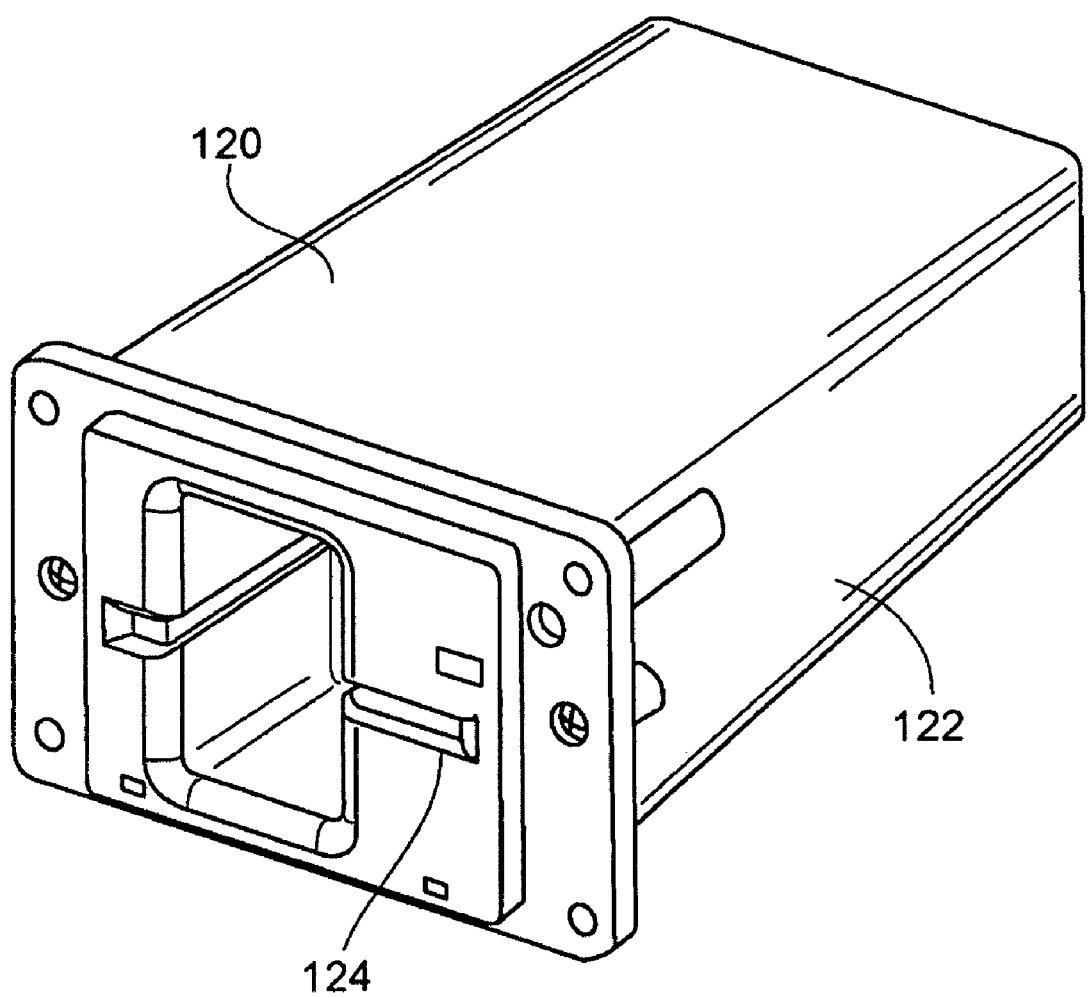
FIG. 1 is a diagram of one embodiment of a hybrid card reader.

In FIG. 1, reference numeral 120 designates a hybrid card reader. Hybrid card reader 120 includes a casing 122 and an opening 124 that permits the insertion of either a mag-stripe card or an IC card (cards not shown). It will be assumed throughout this disclosure that hybrid card reader 120 is operable to read mag-stripe cards. Hybrid card reader 120 also includes a latch for holding inserted cards into place; a latching mechanism coupled to the hybrid card reader 120 for operating the latch; and equipment for reading the magnetic stripe cards and integrated circuit cards, such as an interface terminal that makes an electrical connection with an IC card when it is inserted into hybrid card reader 120. Software may also be included for performing a variety of functions. Such hybrid card readers are well known in the art, so details concerning their conventional operation will not be discussed further.

Figure 2A:
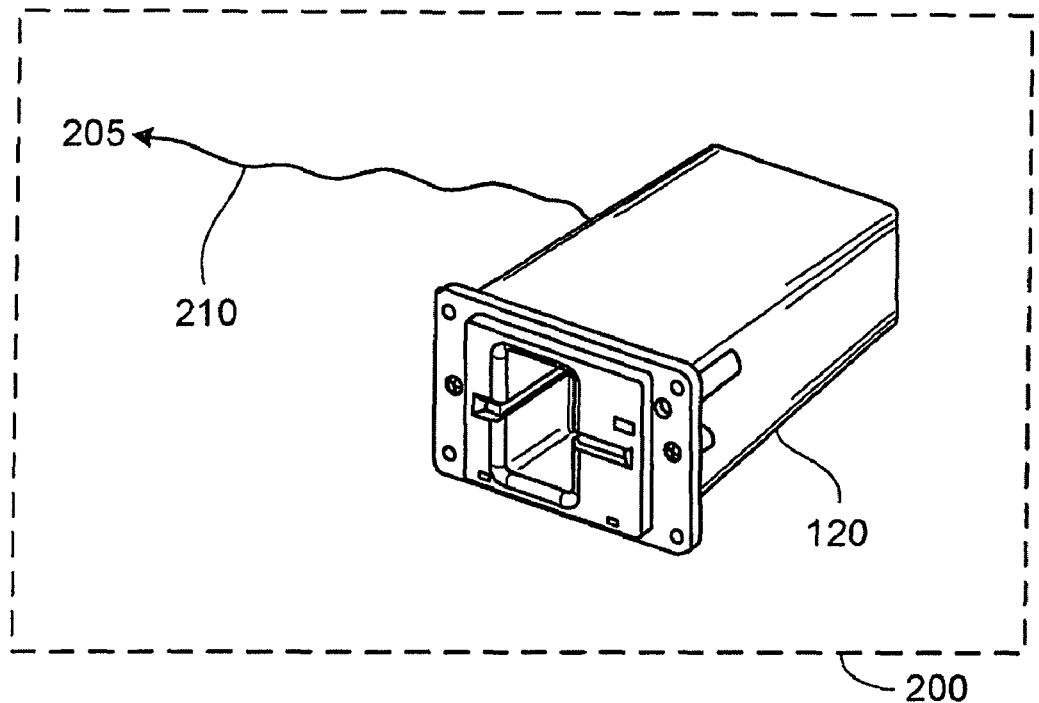
FIGS. 2A-2B provide an overview of a system for enabling and disabling the latching mechanism and/or integrated circuit card reading function of a hybrid card reader.
Figure 2B:
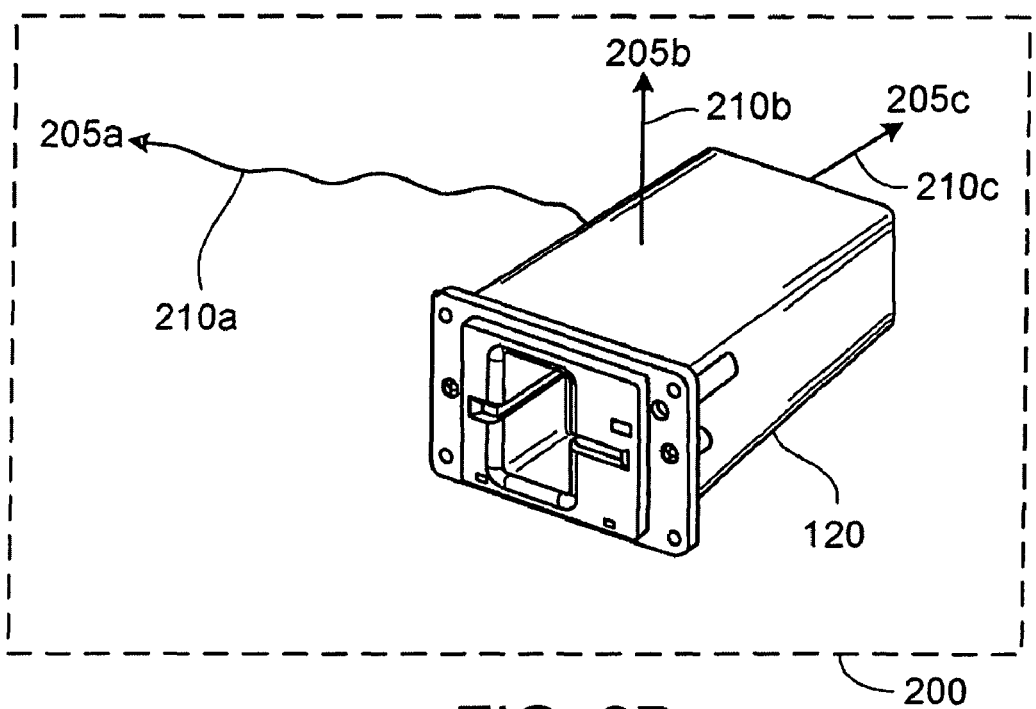

FIGS. 2A-2B illustrate that hybrid card reader 120 will typically be one component of a larger system 200. System 200 may include one or more remote devices 205 (also referred to as "controller(s)") that send one or more signals to hybrid card reader 120 over one or more communication lines 210 or wirelessly. Remote devices 200 could be located in a variety of places, such as in local, regional, national, or even international facilities. Typically, the remote devices 205 will be located offsite from the hybrid card reader, though they could be located on-site if so desired. For instance, if the hybrid card reader 120 were to function in a fuel dispenser, one or more remote devices 205 might be located inside a nearby gas station. Alternatively, the one or more remote devices 205 could be located outside of the hybrid card reader generally and/or outside of the fuel dispenser.

Remote devices 205 send one or more signals to the hybrid card reader 120 in order to enable the latching mechanism and/or integrated circuit card reading function, which may be disabled either because they have never been enabled, or because they were disabled after having been previously enabled. The latching mechanism and/or integrated circuit card reading function may be enabled by one signal sent from a single remote device 205, as shown in FIG. 2A. Multiple signals sent from a single remote device 205, and, as exemplified in FIG. 2B, multiple signals sent from multiple remote devices 205a, 205b and/or 205c, or any combination thereof. Such signals may be analog or digital, and encryption of them may be desirable when possible, particularly if such signals are sent in conjunction with other signals for which encryption is desirable. One or more of these enabling signals may be sent over a single communication line 210, over multiple communication lines 210a, 210b and/or 210c or wirelessly.

Upon receiving the one or more signals, the hybrid card reader 205 will enable its latching mechanism and integrated circuit card reading function. Such enabling may occur substantially simultaneously with the receipt of the one or more signals, or it may be delayed following their receipt. Moreover, such enabling may involve the use of an activation software module that receives one or more of the signals. It is envisioned that the latching mechanism and integrated circuit card reading function might be enabled substantially simultaneously, or sequentially, with either the latching mechanism being enabled before the integrated circuit card reading function, or vice versa.

The insertion of an IC card into the hybrid card reader 120 may be detected by the reader at any time, or in one embodiment, only when either or both of the latching mechanism and integrated circuit card reading function are enabled. When the IC card is detected, the latching mechanism and/or latch will latch it into a position convenient to the hybrid card reader 120. Data from the IC card will be read by the integrated circuit card reading function, and in accordance with the read data, a transaction will be performed. Upon completion of the transaction, the IC card is unlatched and returned to the user.

Not only are the latching mechanism and integrated circuit card reading function capable of being enabled, they are also capable of being disabled. Disabling may be accomplished in several ways. For instance, the latching mechanism and/or integrated circuit card reading function may be enabled by one signal sent from a single remote device 205, as shown in FIG. 2A, multiple signals sent from a single remote device 205, or as exemplified in FIG. 2B, multiple signals sent from multiple remote devices 205a, 205b and/or 205c or any combination thereof. The one or more remote devices 205 that send the disabling signal(s) could be identical to or different from any remote devices 205 that send any enabling signals. Again, such disabling signals may be analog or digital, and encryption of them may be desirable when possible. One or more of these signals may be sent over a single communication line 210, over multiple communication lines, exemplified in FIG. 2B as 210a, 210b and/or 210c or wirelessly.

Alternatively, the latching mechanism and/or integrated circuit card reading function could be disabled without the receipt of a signal, as could occur if the hybrid card reader 120 or one or more of the associated components have one or more built-in timing mechanisms that automatically disable these components after a period of time. As with enabling, it is envisioned that the latching mechanism and integrated circuit card reading function could be disabled simultaneously, substantially simultaneously, or sequentially, with either the latching mechanism being disabled before the integrated circuit card reading function, or vice versa.

Figure 3:
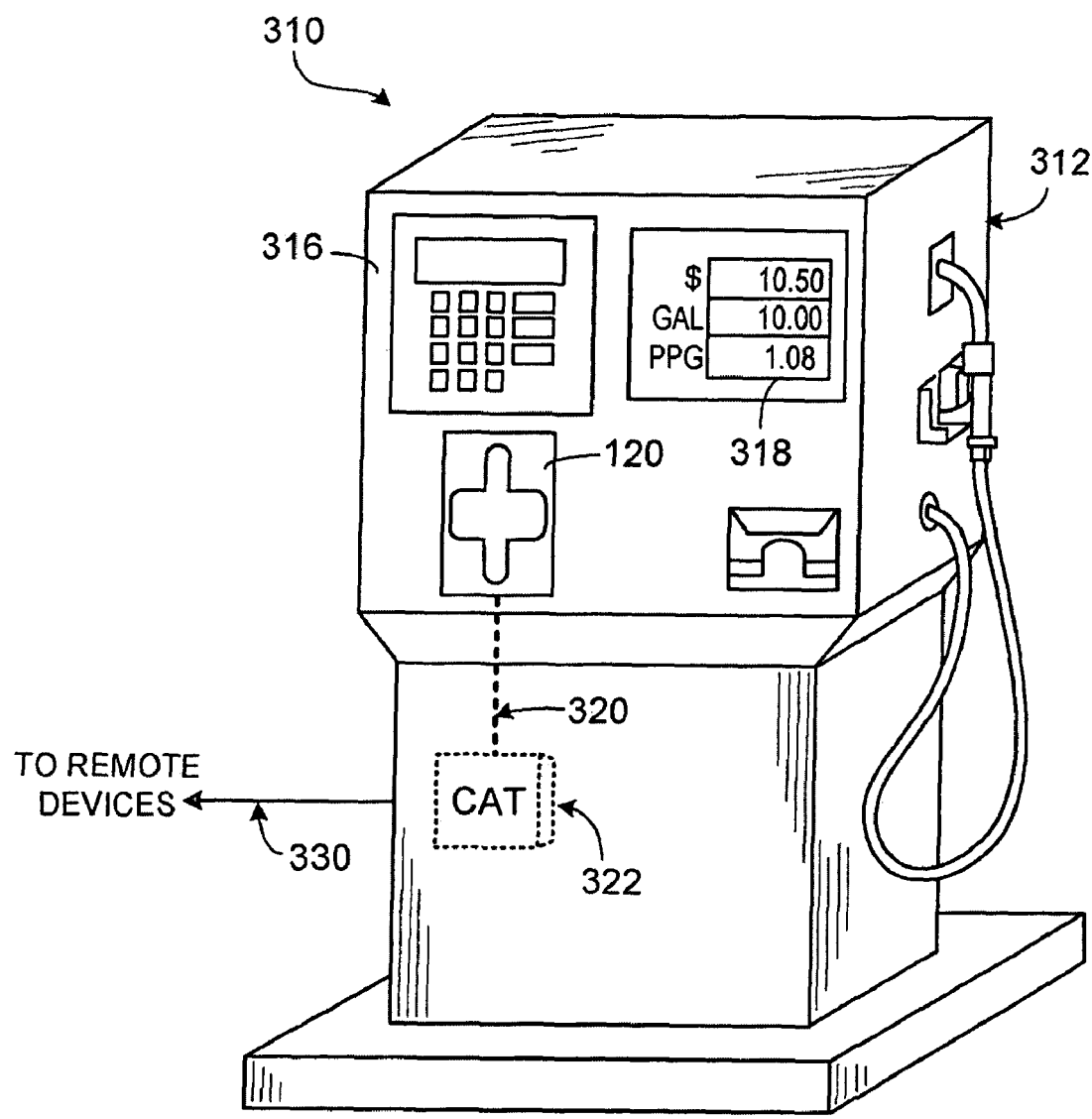
FIG. 3 shows an example fuel dispensing environment housing a hybrid card reader.

FIG. 3 illustrates that hybrid card reader 120 may function in conjunction with a fuel dispensing environment 310. Fuel dispensing environment 310 may include a fuel dispenser 312, a keypad 316, a display 318, a hybrid card reader 120, an internal connection 320, an internal controller 322, and one or more communication lines 330 that connect to remote devices (not shown). Further details of components and functionalities that may be included in the fuel dispensing environment 310 are found in U.S. Pat. No. 6,112,981, U.S. Pat. No. 6,321,984, and U.S. Patent Application Publication No. US 2003/0106934 A1, which are hereby incorporated by reference in their entirety.

The embodiments previously described provide a number of advantages. For example, it is possible to reduce the "wear and tear" on the latching mechanism of a hybrid card reader by leaving it disabled until it needs to be enabled. Further, the ability to enable the latching mechanism and integrated circuit card reading function from one or more remote locations facilitates managerial control and supervision over the enabling status of these components.

Although illustrative embodiments of the invention have been shown and described, a wide range of modifications, changes, and substitutions are contemplated in the foregoing disclosure. For instance, it is possible to utilize hybrid card readers in environments other than fuel dispenser systems, such as at supermarkets, cash registers, devices associated with financial transactions, and point of sale transaction devices more generally.

In certain instances, some features of the present invention may be employed without a corresponding use of the other features. Nevertheless, it will be understood that various modifications may be made without departing from the spirit and scope of the invention. Accordingly, other embodiments are within the scope of the following claims, and it is appropriate that the appended claims be construed broadly and in a manner consistent with the scope of the invention.

What is claimed is:

1. A method for operating a hybrid card reader that is operable to read magnetic stripe cards and that, upon the receipt of a signal, becomes operable to read integrated circuit cards, which comprises:

receiving a first integrated circuit card into the hybrid card reader while the hybrid card reader is receiving power and in a disabled state, wherein the hybrid card reader is operable to read a magnetic stripe card while the hybrid card reader is receiving power and in the disabled state, and wherein the hybrid card reader is inoperable to activate a latching mechanism and an integrated circuit card reading function while the hybrid card reader is receiving power and in the disabled state;

receiving a first signal from a first remote device;

switching the hybrid card reader from the disabled state to an enabled state in response to the receipt of the first signal by the hybrid card reader, wherein the hybrid card reader enables at least one of the latching mechanism and the integrated circuit card reading function while the hybrid card reader is receiving power and in the enabled state; and subsequent to switching to the enabled state and while the hybrid card reader is receiving power, detecting the insertion of a second integrated circuit card into the hybrid card reader.

2. The method of claim 1, wherein activation software in the hybrid card reader receives the first signal and performs the enabling of a latching mechanism and an integrated circuit card reading function of the hybrid card reader.

3. The method of claim 1, wherein the enabling of the latching mechanism occurs before the enabling of the integrated circuit card reading function of the hybrid card reader.

4. The method of claim 1, wherein the enabling of the latching mechanism and the enabling of the integrated circuit card reading function of the hybrid card reader occur substantially simultaneously.

5. The method of claim 1, wherein the first signal travels over a first communication line connected to the hybrid card reader and the first remote device.

6. The method of claim 1, which further comprises:
latching, with the latching mechanism, the second integrated circuit card into a position convenient to the hybrid card reader.

7. The method of claim 6, which further comprises:
reading data contained on the second integrated circuit card; and
performing a transaction in accordance with data read from the second integrated circuit card.

8. The method of claim 7, which further comprises:
unlatching the second integrated circuit card after the performance of the transaction; and
returning the second integrated circuit card to a user.

9. The method of claim 8, which further comprises disabling the latching mechanism and the integrated circuit card reading function of the hybrid card reader by no longer sending the first signal to the hybrid card reader.

10. The method of claim 8, which further comprises:
receiving a second signal from a second remote device; and
disabling the latching mechanism and the integrated circuit card reading function of the hybrid card reader in response to the receipt of the second signal by the hybrid card reader.

11. The method of claim 10, wherein the second remote device is the same device as the first remote device.

12. The method of claim 10, wherein the disabling of the latching mechanism and the disabling of the integrated circuit card reading function occur substantially simultaneously.

13. The method of claim 10, wherein the second signal travels over a second communication line.

14. The method of claim 13, wherein the second communication line is the same line as the first communication line.

15. The method of claim 1, wherein switching at least one of a latching mechanism and an integrated circuit card reading function of the hybrid card reader comprises switching both of a latching mechanism and an integrated circuit card reading function of the hybrid card reader.

16. A method for operating a hybrid card reader that is operable to read only magnetic stripe cards and that, upon the receipt of one or more signals, becomes operable to read integrated circuit cards and magnetic stripe cards, which comprises:
receiving a magnetic stripe card inserted into the hybrid card reader while the hybrid card reader is in a disabled state;
reading data from a magnetic stripe of the magnetic stripe card while the hybrid card reader is in the disabled state;
receiving an integrated circuit card into the hybrid card reader while the reader is in the disabled state and is receiving power, wherein the hybrid card reader is inoperable to activate a latching mechanism and an integrated circuit card reading function of the hybrid card reader in the disabled state while receiving power;
receiving the one or more signals from one or more remote devices; and
enabling the latching mechanism and the integrated circuit card reading function of the hybrid card reader in response to the receipt of the one or more signals by the hybrid card reader.

17. The method of claim 16, wherein the one or more signals are sent from a single device.

18. The method of claim 16, wherein the one or more signals travel over one or more communication lines.

19. A system for reading magnetic stripe cards and integrated circuit cards, comprising:
a hybrid card reader operable to:
receive a magnetic stripe card and read data from a magnetic stripe on the magnetic stripe card while the hybrid card reader is in a disabled state and receiving power,
receive an integrated circuit card into the hybrid card reader while in the disabled state and is receiving power, wherein the hybrid card reader is inoperable to activate a latching mechanism and an integrated circuit card reading function of the hybrid card reader in the disabled state while receiving power,
receive one or more signals,
after the receipt of the one or more signals and while the hybrid card reader is receiving power, switch from the disabled state to an enabled state; and
subsequent to switching from the disabled state to the enabled state, lock the integrated circuit card into the reader at a position convenient to the hybrid card reader with the latching mechanism and read the integrated circuit card with the integrated circuit card reading function;
an interface terminal for making an electrical connection with the integrated circuit card that is inserted into the reader, said interface terminal connected to the hybrid card reader;
one or more communication links connected to the hybrid card reader and operable to transmit one or more signals to the hybrid card reader; and
one or more controllers located remote from the hybrid card reader and connected to the one or more communication links, said one or more controllers operable to transmit the one or more signals over the one or more communication links to the hybrid card reader, said one or more signals rendering the hybrid card reader operable to read integrated circuit cards and rendering the latching mechanism operable to lock a card in a position convenient to the hybrid card reader.

20. The system of claim 19, wherein one or more controllers are operable to send one or more signals over the communication link to the hybrid card reader in order to render the hybrid card reader inoperable to read integrated circuit cards and to render the latching mechanism inoperable to lock a card in a position convenient to the hybrid card reader.

21. The system of claim 19, wherein the one or more controllers consist of a single controller.

* * * * *